(12) United States Patent
Song (10) Patent No.: US 10,430,260 B2
(45) Date of Patent: Oct. 1, 2019

(54) TROUBLESHOOTING METHOD, COMPUTER SYSTEM, BASEBOARD MANAGEMENT CONTROLLER, AND SYSTEM

(71) Applicant: HUAWEI TECHNOLOGIES CO., LTD., Shenzhen, Guangdong (CN)

(72) Inventor: Gang Song, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 199 days.

(21) Appl. No.: 15/709,824

(22) Filed: Sep. 20, 2017

(65) Prior Publication Data
US 2018/0157525 A1 Jun. 7, 2018

Related U.S. Application Data

(63) Continuation of application No. PCT/CN2017/071617, filed on Jan. 19, 2017.

(30) Foreign Application Priority Data

Dec. 5, 2016 (WO) ................. PCT/CN2016/108556

(51) Int. Cl.
*G06F 11/00* (2006.01)
*G06F 11/07* (2006.01)
(Continued)

(52) U.S. Cl.
CPC ........ *G06F 11/0706* (2013.01); *G06F 9/4812* (2013.01); *G06F 11/0703* (2013.01);
(Continued)

(58) Field of Classification Search
CPC ............. G06F 11/0703; G06F 11/0706; G06F 11/0751; G06F 11/0766; G06F 11/0772; G06F 11/079; G06F 9/4812; G06F 13/24
See application file for complete search history.

(56) References Cited

U.S. PATENT DOCUMENTS 7,120,717 B2    10/2006   Vu
10,229,017 B1 *  3/2019   Zou ..................... G06F 11/2007
(Continued)

FOREIGN PATENT DOCUMENTS

CN    101106441 A    1/2008
CN    102135912 A    7/2011
(Continued)

*Primary Examiner* — Joshua P Lottich
(74) *Attorney, Agent, or Firm* — Huawei Technologies Co., Ltd.

(57) ABSTRACT

A troubleshooting method implemented by a processor device is provided, comprising determining, according to collected information of correctable errors, that a correctable error storm has occurred, disabling a system management interrupt (SMI) of generation modules of correctable errors in a correctable error set, wherein the correctable error set comprises correctable errors related to the correctable error storm, sending SMI-disabled notification information to a baseboard management controller (BMC), receiving enable-SMI notification information that is sent by the BMC after a predetermined time elapses after the SMI-disabled notification information has been received, and enabling the disabled SMI of the generation modules of the correctable errors according to the enable-SMI notification information.

20 Claims, 7 Drawing Sheets (51) Int. Cl.
    *G06F 9/48*         (2006.01)
    *G06F 13/24*       (2006.01)
    *G06F 9/4401*     (2018.01)

(52) U.S. Cl.
    CPC ............ *G06F 13/24* (2013.01); *G06F 9/4401* (2013.01); *G06F 2213/2404* (2013.01)

(56) References Cited

U.S. PATENT DOCUMENTS

| | | | |
|---|---|---|---|
| 2007/0061634 A1* | 3/2007 | Marisetty | G06F 11/0793 714/48 |
| 2007/0234023 A1* | 10/2007 | Wu | G06F 8/61 713/1 |
| 2010/0037044 A1 | 2/2010 | Yang et al. | |
| 2017/0102985 A1 | 4/2017 | Song | |
| 2017/0344419 A1* | 11/2017 | Watkins | G06F 11/076 |
| 2019/0146895 A1* | 5/2019 | Zhang | G06F 13/4022 |

FOREIGN PATENT DOCUMENTS

| | | |
|---|---|---|
| CN | 104486100 A | 4/2015 |
| CN | 105117301 A | 12/2015 |
| CN | 105808394 A | 7/2016 |
| CN | 106201753 A | 12/2016 |
| CN | 105659215 B | 8/2017 |
| TW | 201220076 A1 | 5/2012 |

\* cited by examiner

TROUBLESHOOTING METHOD, COMPUTER SYSTEM, BASEBOARD MANAGEMENT CONTROLLER, AND SYSTEM

CROSS-REFERENCE TO RELATED APPLICATIONS

This application is a continuation of International Application No. PCT/CN2017/071617, filed on Jan. 19, 2017, which claims priority to International application No. PCT/CN2016/108556, filed on Dec. 5, 2016. The disclosures of the aforementioned applications are hereby incorporated by reference in their entireties.

TECHNICAL FIELD

The present disclosure relates to the field of information technologies, and more specifically, to a troubleshooting method, a computer system, a baseboard management controller, and a system.

BACKGROUND

When an error occurs on a computer system, for a regular error, the system generates a system management interrupt (SMI), then collects error data, and performs further processing according to the error data, so as to detect a fault.

For many devices, after a hardware fault (for example, a memory chip fault or a memory data cable fault) occurs, a correctable error may be generated. The correctable error means that the error can be corrected. When a correctable error occurs, a system can continue running. However, if the correctable error is caused by a hardware fault, before the hardware fault is cleared, a continuous correctable error storm occurs. Though the system can still continue running, the system runs in an ill state, and system performance deteriorates and a critical error occurs at a significantly higher probability if the system continues running. In this case, an alarm about a faulty module should be generated immediately and the faulty module should be replaced as soon as possible. That is, error data about the correctable error storm needs to be collected, so as to detect the hardware fault.

However, in the case of a continuous correctable error storm, if error data is collected using an SMI, the system may fall into an SMI interrupt trap, and in symptom, the system is suspended or crashed. Therefore, how to effectively handle a correctable error storm has become an urgent technical problem to be resolved.

SUMMARY

A troubleshooting method implemented by a processor device is provided, comprising determining, according to collected information of correctable errors, that a correctable error storm has occurred, disabling a system management interrupt (SMI) of generation modules of correctable errors in a correctable error set, wherein the correctable error set comprises correctable errors related to the correctable error storm, sending SMI-disabled notification information to a baseboard management controller (BMC), receiving enable-SMI notification information that is sent by the BMC after a predetermined time elapses after the SMI-disabled notification information has been received, and enabling the disabled SMI of the generation modules of the correctable errors according to the enable-SMI notification information.

A troubleshooting method implemented by a processor device is provided, comprising receiving SMI-disabled notification information that is sent by a basic input/output system (BIOS) after a system management interrupt (SMI) of generation modules of correctable errors in a correctable error set has been disabled, and sending enable-SMI notification information to the BIOS after a predetermined time, wherein the enable-SMI notification information is used to instruct the BIOS to enable the disabled SMI of the generation modules of the correctable errors.

A computer system is provided, comprising a basic input/output system (BIOS) chip storing instructions, and a processor in communication with the BIOS chip. The processor is configured to execute the instructions to determine, according to collected information of correctable errors, that a correctable error storm has occurred, disable system management interrupt (SMI) of generation modules of correctable errors in a correctable error set, wherein the correctable error set comprises correctable errors related to the correctable error storm, send SMI-disabled notification information to a baseboard management controller (BMC), and receive enable-SMI notification information sent by the BMC after a predetermined time elapses after the SMI-disabled notification information has been received. The processor enables the disabled SMI of the generation modules according to the enable-SMI notification information.

A baseboard management controller (BMC) is provided, comprising a receiving device configured to receive SMI-disabled notification information sent by a basic input/output system (BIOS) after system management interrupt (SMI) of generation modules of correctable errors in a correctable error set has been disabled, and a sending device configured to send enable-SMI notification information to the BIOS after a predetermined time, wherein the enable-SMI notification information instructs the BIOS to enable the disabled SMI of the generation modules.

DESCRIPTION OF EMBODIMENTS

The following describes technical solutions of the embodiments of the present disclosure with reference to the accompanying drawings.

Figure 1:
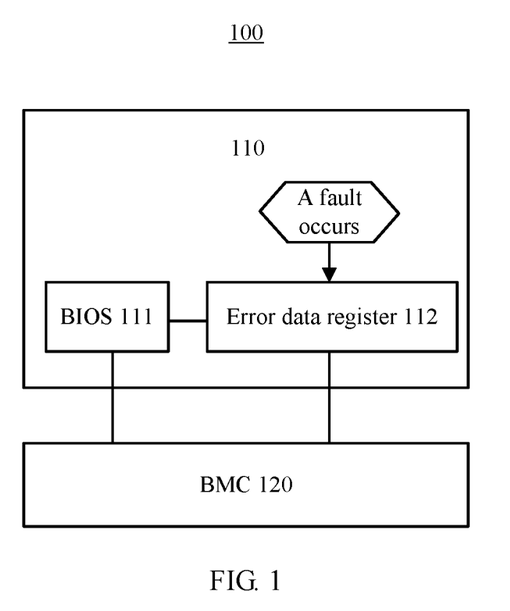
FIG. 1 is a diagram of a system to which a technical solution of an embodiment of the present disclosure is applied.

FIG. 1 is a diagram of a system to which a technical solution of an embodiment of the present disclosure is applied. As shown in FIG. 1, a system 100 includes a primary system 110 and a BMC 120. The primary system 110 is a computer system, and may include various computer system components, including various computer hardware and software such as a processor, a BIOS. A BIOS 111 may provide most immediate lowest-layer hardware settings and control for the primary system 110. The BMC 120 may be configured to: monitor the primary system 110, and perform diagnosis, control, hardware management, fault clearing, and the like on the primary system 110. The BMC 120 and the primary system 110 may be deployed in one mainboard, or certainly, the BMC 120 and the primary system 110 may be deployed separately.

It should be understood that the system 100 in FIG. 1 may also be referred to as a computer system. A specific name of the system is not limited in the present disclosure.

After a fault occurs, for a critical error such as a crash, the primary system 110 generates an out-of-band internal error (IERR) signal (for example, using an enhanced machine check architecture (EMCA) in the primary system 110) to notify the BMC 120; and after receiving the signal, the BMC 120 proactively reads and collects, in a traversal manner, error data recorded in an error data register 112. For a regular error, the primary system 110 generates an SMI interrupt; and an SMI interrupt program of the BIOS 111 reads the error data recorded in the error data register 112, and transfers the error data to the BMC 120. Then, the BMC 120 performs further processing such as parsing and log printing on the collected error data. For a critical error, the BMC 120 further analyzes and locates a fault source based on the error data. For the regular error, the BMC 120 performs counting, makes warning analysis, and so on.

However, for correctable errors, if the foregoing handling procedure is used, an interrupt trap, that is, continuous interrupts, may be caused.

A correctable error means that the error can be corrected. When a correctable error occurs, a system can continue running. In one case, a correctable error is caused by an occasional software interrupt or line interference. Such a correctable error is cleared rapidly without affecting system performance. In another case, a correctable error is caused by a hardware fault. In this case, a correctable error storm will occur. In the case of a correctable error storm, if the foregoing procedure is used to collect error data, the primary system may fall into an SMI interrupt trap, that is, an interrupt storm occurs. In symptom, the primary system is suspended or crashed.

According to the technical solution provided in this embodiment of the present disclosure, in the case of a correctable error storm, error data can be collected, a hardware fault can be detected, and no interrupt trap occurs.

Figure 2:
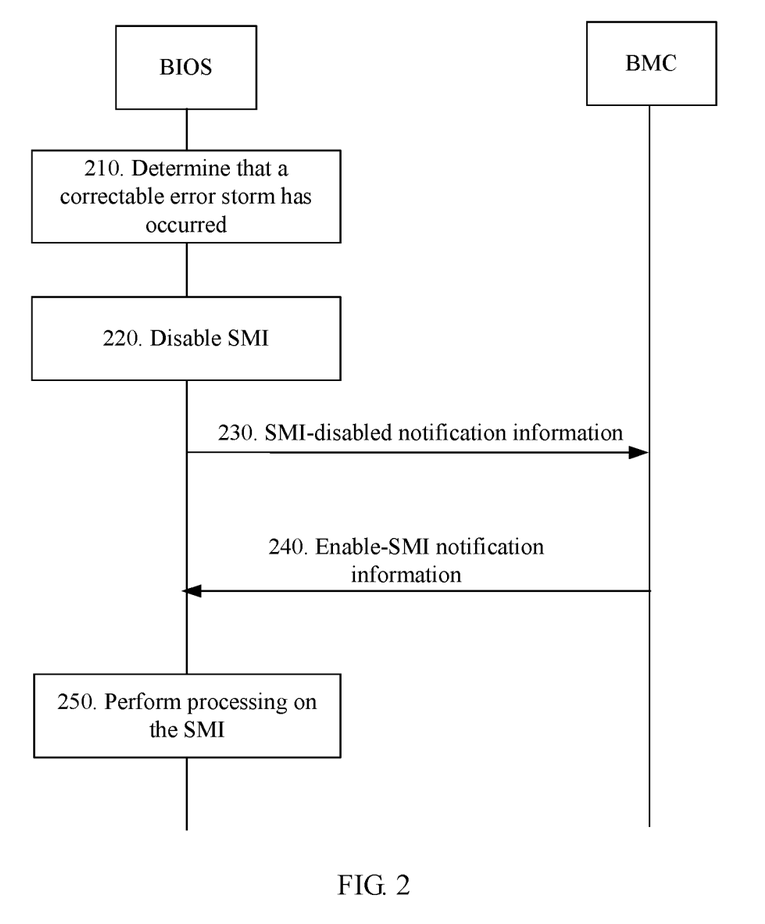
FIG. 2 is a flowchart of a troubleshooting method according to an embodiment of the present disclosure.

FIG. 2 is a flowchart of a troubleshooting method according to an embodiment of the present disclosure. FIG. 2 describes the troubleshooting method in this embodiment of the present disclosure using a BIOS and a BMC. The BIOS in FIG. 2 may be the BIOS 111 in FIG. 1, and the BMC in FIG. 2 may be the BMC 120 in FIG. 1.

It should be understood that a procedure executed by the BIOS may be further implemented by a processor (for example, a CPU) by executing a module in the BIOS, and a procedure executed by the BMC may be further implemented by a microprocessor in the BMC by executing a module in the BMC. This is not limited in this embodiment of the present disclosure.

210. The BIOS determines, according to collected information of correctable errors, that a correctable error storm has occurred.

Further, in this embodiment of the present disclosure, correctable error storm detection is performed. After a correctable error occurs, the BIOS collects the correctable error and reads error data of the correctable error from an error data register. The BIOS sends the error data of the correctable error to the BMC, and the BMC parses the error data and further performs alarming, archiving, or other processing. In addition, the BIOS determines, according to collected information of current correctable errors, whether a correctable error storm has occurred.

Optionally, if a quantity of correctable errors has reached a predetermined value, it is determined that a correctable error storm has occurred. Correctable errors related to the correctable error storm are currently collected correctable errors whose quantity is the predetermined value. A set of correctable errors whose quantity is the predetermined value may be referred to as a correctable error set.

For example, the predetermined value may be 10. That is, if 10 correctable errors are currently counted, it is determined that a correctable error storm has occurred. The 10 correctable errors are correctable errors related to the correctable error storm. That is, the correctable error set includes the 10 correctable errors.

It should be understood that, in this specification, magnitudes of the "predetermined value", "predetermined time", "predetermined interval", "predetermined quantity of times", and the like may be set in various manners, for example, may be obtained in various manners such as counting, learning, training, and emulation. This is not limited in this embodiment of the present disclosure.

Optionally, the quantity of correctable errors may be counted by collecting a first correctable error, and setting the quantity of correctable errors to 1 if a quantity of current correctable errors is zero. Or, the quantity of correctable errors may be counted by setting the quantity of correctable errors to 1 if a quantity of current correctable errors is not zero and an interval between an occurrence time of the first correctable error and an occurrence time of a second correctable error is greater than a predetermined interval, where the second correctable error is a last correctable error that occurs before the first correctable error. Or, the quantity of correctable errors may be counted by increasing the quantity of correctable errors by 1 if a quantity of current correctable errors is not zero and an interval between an occurrence time of the first correctable error and an occurrence time of a second correctable error is less than a predetermined interval.

For example, the predetermined interval may be one minute.

It should be understood that, in this specification, "greater than" and "less than" may be replaced with "not less than" and "not greater than". This is not limited in this embodiment of the present disclosure.

Further, when a correctable error occurs, the BIOS not only sends error data of the correctable error to the BMC, but also counts the quantity of correctable errors. The BIOS may learn a generation module of the correctable error, that is, obtain information about a module that reports the correctable error, and obtain an occurrence time of the correctable error. The BIOS determines whether the quantity of current correctable errors is zero. If the quantity of current correctable errors is zero, it indicates that the correctable error is a first correctable error, and the BIOS sets the quantity of correctable errors to 1. If the quantity of current correctable errors is not zero, the BIOS further determines whether an interval between occurrences of the correctable errors is greater than the predetermined interval, for example, one minute. If an interval between an occurrence time of a current correctable error and an occurrence time of a previous correctable error is greater than the predetermined interval, recounting is required. In this case, the BIOS resets the quantity of correctable errors to 1. If the quantity of current correctable errors is not zero, and an interval between an occurrence time of a current correctable error and an occurrence time of a previous correctable error is less than the predetermined interval, the BIOS increases the quantity of correctable errors by 1.

Then, the BIOS determines whether the quantity of correctable errors has reached the predetermined value, for example, 10. If the quantity of correctable errors has not reached the predetermined value, the BIOS proceeds to count a next correctable error. If the quantity of correctable errors has reached the predetermined value, the BIOS determines that the correctable error storm has occurred, and may perform processing in step 220 and set the quantity of correctable errors to zero.

220. The BIOS disables SMI of generation modules of correctable errors in a correctable error set, where the correctable error set includes correctable errors related to the correctable error storm.

Further, when determining that the correctable error storm has occurred, the BIOS disables the SMI of the generation modules of the correctable errors in the correctable error set. In the case of a correctable error storm, SMI interrupts may be generated frequently. An SMI interrupt trap can be avoided by disabling SMI of corresponding modules.

It should be understood that SMI of a generation module of each correctable error in the correctable error set may be disabled, or SMI of generation modules of some correctable errors in the correctable error set may be disabled.

In this embodiment of the present disclosure, the BIOS first collects correctable errors, and when determining that a correctable error storm has occurred, disables SMI of generation modules of correctable errors related to the correctable error storm. In this way, when these modules generate correctable errors again, no more SMI interrupts are generated. If there is a correctable-error generation module whose SMI is not disabled, the module may generate another correctable error and an SMI interrupt may be caused. In this case, if a large quantity of correctable errors are generated again, a next disabling operation may be performed. That is, steps 210 and 220 and a subsequent step 230 may be repeatedly performed.

For example, the foregoing predetermined value is 10. If 10 correctable errors are collected, SMI of generation modules of correctable errors in the 10 correctable errors is disabled. If SMI of generation modules of only some correctable errors is disabled, other 10 correctable errors may be collected later. In this case, another disabling operation may be performed.

Optionally, after disabling the SMI of the generation module of each correctable error in the correctable error set, the BIOS may set the quantity of correctable errors to zero, to detect a next correctable error storm. Optionally, if the SMI of the generation modules of the only some correctable errors is disabled, the quantity of correctable errors may be set to a quantity of remaining correctable errors, where SMI of generation modules of the remaining correctable errors is not disabled.

230. The BIOS sends SMI-disabled notification information to the BMC.

After disabling the SMI of the corresponding modules, the BIOS sends the SMI-disabled notification information to the BMC, to notify the BMC that the SMI is disabled.

Further, the BIOS may send the SMI-disabled notification information to the BMC using an intelligent platform management interface (IPMI).

Optionally, in order that the BMC can send control information, the BIOS may set a general purpose input/output (GPIO) interface to GPI.

240. The BMC sends enable-SMI notification information to the BIOS.

After receiving the SMI-disabled notification information sent by the BIOS, the BMC may perform timing, and send the enable-SMI notification information to the BIOS after a predetermined time. Optionally, the predetermined time may be 10 minutes. The enable-SMI notification information is used to instruct the BIOS to enable the disabled SMI of the generation modules of the correctable errors.

Optionally, the BMC may start timing each time the SMI-disabled notification information is received. That is, the BMC starts timing when receiving the SMI-disabled notification information, and if the BMC receives next SMI-disabled notification information within the predetermined time, performs timing again, and sends the enable-SMI notification information after performing timing for the predetermined time.

Further, the BIOS may repeatedly perform steps 210 to 230. That is, before receiving the enable-SMI notification information sent by the BMC, the BIOS may perform multiple disabling operations, and continually send the SMI-disabled notification information to the BMC. For example, if a relatively small "predetermined value" is set, relatively few modules are involved in one disabling operation, or SMI of generation modules of only some correctable errors is disabled in step 220. Therefore, a module may still continue to generate a correctable error. In this case, before receiving the enable-SMI notification information sent by the BMC, the BIOS may perform another disabling operation. Therefore, if the BMC receives next SMI-disabled notification information within the predetermined time, the BMC performs timing again, and then sends the enable-SMI notification information after performing timing for the predetermined time, to instruct the BIOS to enable the disabled SMI of the modules.

250. The BIOS enables the disabled SMI of the generation modules of the correctable errors according to the enable-SMI notification information.

After receiving the enable-SMI notification information sent by the BMC, the BIOS performs processing on the disabled SMI of the generation modules of the correctable errors.

Optionally, the BIOS may set the GPIO interface to GPO.

Optionally, if a quantity of times for which SMI of a first module is disabled is less than a predetermined quantity of times, the SMI of the first module is enabled; or if a quantity of times for which SMI of a first module is disabled has reached a predetermined quantity of times, the SMI of the first module is not enabled again. The first module is an SMI-disabled correctable-error generation module.

Optionally, the predetermined quantity of times may be 3.

Further, after receiving the enable-SMI notification information sent by the BMC, the BIOS may traverse generation modules of correctable errors and sequentially enable disabled SMIs of the generation modules of correctable errors. Modules involved in disabling operations may not be the same. Therefore, quantities of disabling times of different modules may be different. For example, if a module is involved in each disabling operation, a quantity of disabling times of the module is relatively large. If a module is not involved in each disabling operation, a quantity of disabling times of the module is relatively small. Therefore, after the BIOS receives the enable-SMI notification information sent by the BMC, if SMI of a module is disabled, and a quantity of disabling times is less than the predetermined quantity of times, the BIOS enables the SMI of the module; or if SMI of a module is disabled, and a quantity of disabling times has reached the predetermined quantity of times, the BIOS does not enable the SMI of the module again, that is, the SMI of the module is disabled permanently.

An interrupt trap can be avoided by disabling SMI of generation modules of correctable errors related to a correctable error storm, and the disabled SMI of the generation modules of the correctable errors is enabled after a predetermined time. This can not only exclude a correctable error storm caused by a non-hardware fault, for example, a correctable error storm caused by occasional software interrupts or line interference, such that a generation module of a correctable error caused by the non-hardware fault is not affected, but also collect error data. Therefore, a hardware fault can be detected in the case of a correctable error storm caused by the hardware fault.

Optionally, if the BMC determines, according to the SMI-disabled notification information, that the quantity of times for which the SMI of the first module is disabled has reached the predetermined quantity of times, the BMC outputs fault alarm information of the first module.

Further, if a quantity of times for which SMI of a module is disabled has reached the predetermined quantity of times, it may be determined that a hardware fault has occurred, that is, correctable errors are caused by the hardware fault. Therefore, the BMC outputs fault alarm information of the module, such that the hardware fault can be cleared in a timely manner, so as to ensure system performance.

According to the troubleshooting method in this embodiment of the present disclosure, SMI of generation modules of correctable errors is disabled and enabled, such that error data can be collected without an interrupt trap, and a generation module of a correctable error caused by a non-hardware fault is not affected. Therefore, a correctable error storm can be effectively handled.

Optionally, enabling of the SMI of the generation modules of the correctable errors may not be controlled by the BMC. For example, the enabling of the SMI may be controlled by the BIOS. Further, after performing the foregoing SMI disabling operation, the BIOS may start timing, and then perform the foregoing SMI enabling operation after performing timing for the predetermined time.

Optionally, a fault alarm operation may not be performed by the BMC. For example, fault alarming may be performed by an OS. Further, the OS may obtain a quantity of times for which SMI of a module is disabled. If the quantity of times for which the SMI of the module is disabled has reached the predetermined quantity of times, the OS may determine that a hardware fault has occurred, and output fault alarm information of the module.

The following describes the embodiments of the present disclosure in detail with reference to specific examples. It should be noted that these examples are merely intended to help a person skilled in the art better understand the embodiments of the present disclosure, but not to limit the scope of the embodiments of the present disclosure.

Figure 3:
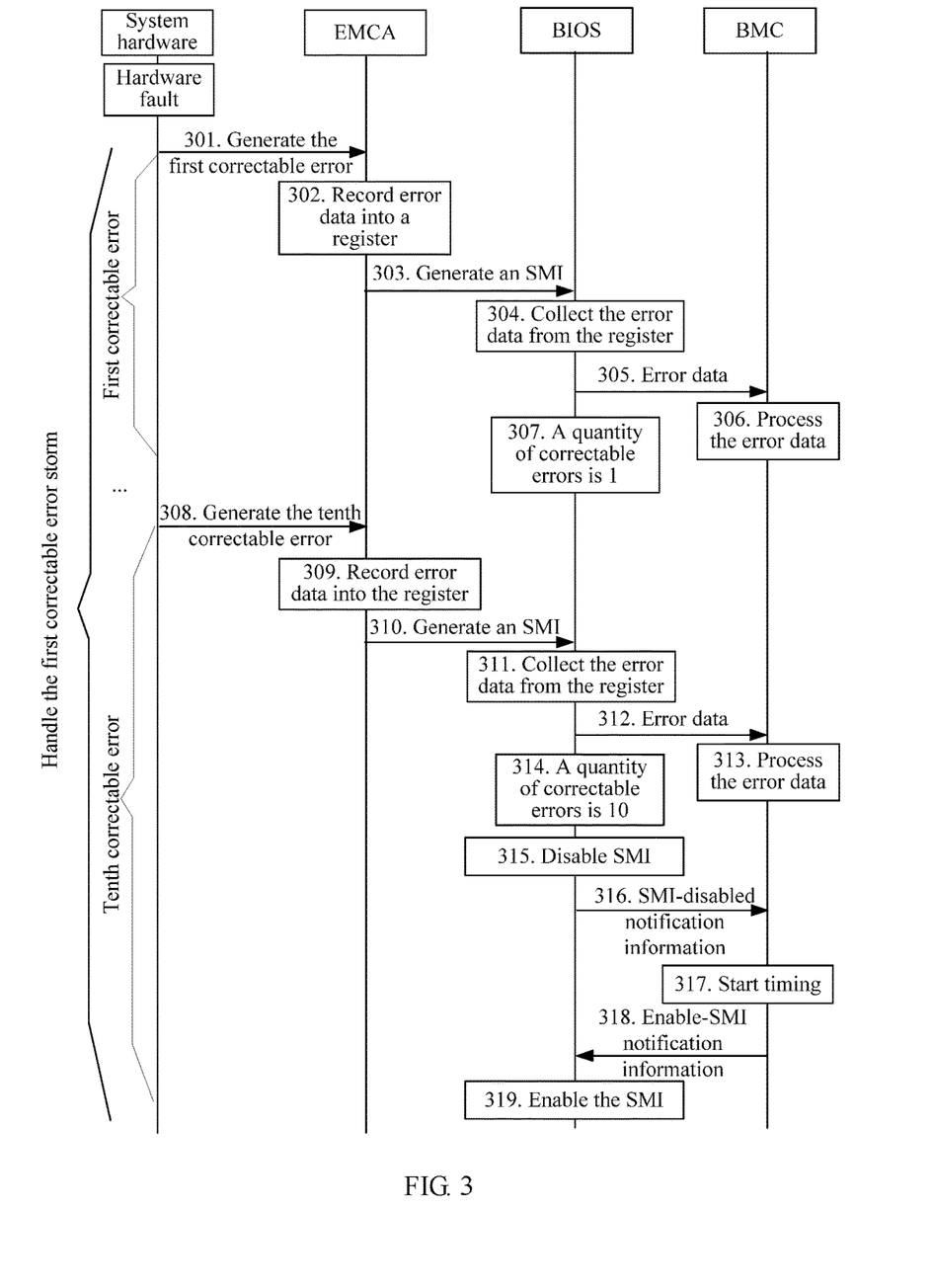
FIG. 3 is a sequence diagram of a troubleshooting method according to an embodiment of the present disclosure.
Figure 4:
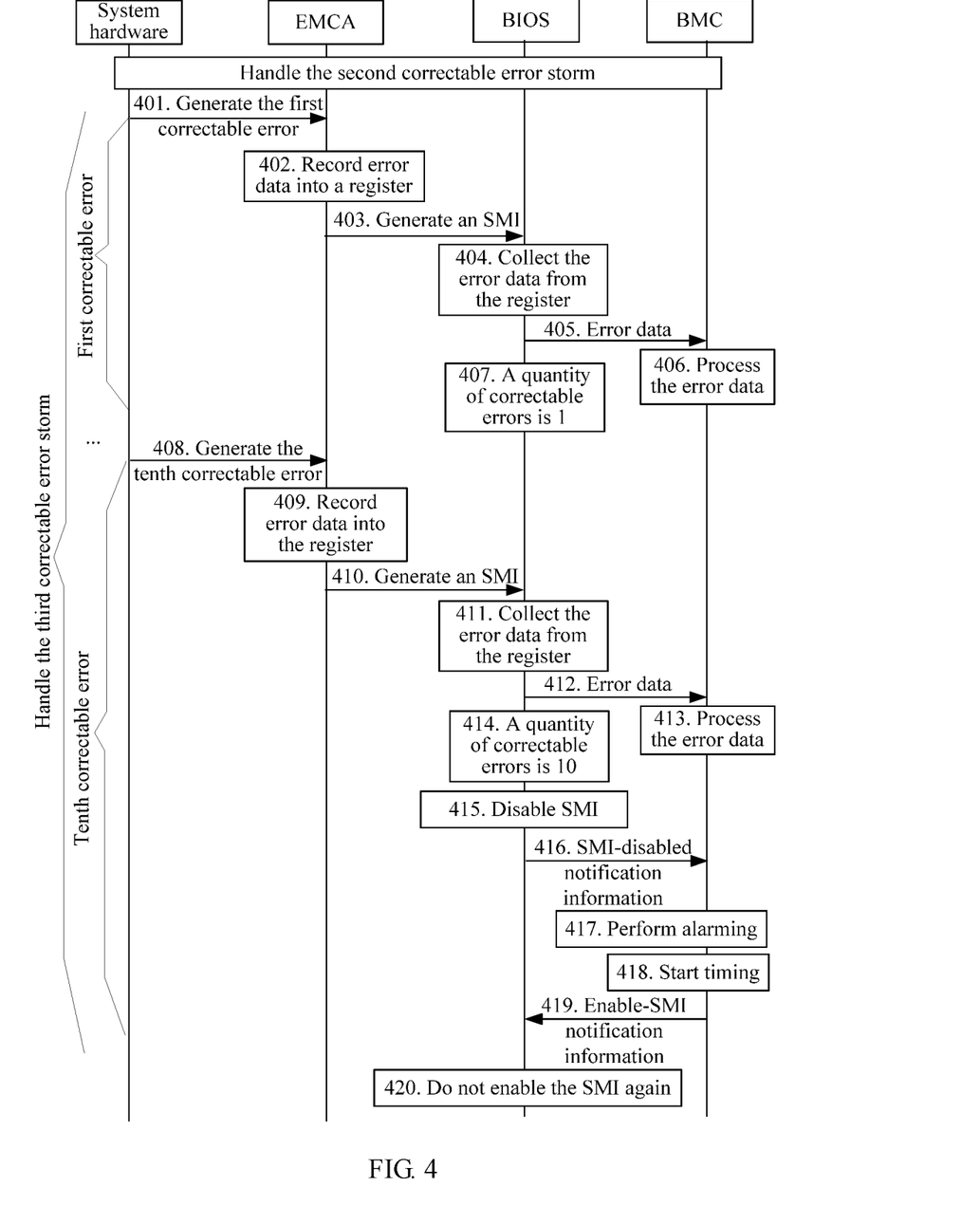
FIG. 4 is a sequence diagram of a troubleshooting method according to another embodiment of the present disclosure.

FIG. 3 and FIG. 4 are sequence diagrams of a troubleshooting method according to an embodiment of the present disclosure.

In an example of this embodiment, a predetermined quantity of times for which SMI is disabled is 3. FIG. 3 shows a manner of handling the first correctable error storm. FIG. 4 shows a manner of handling the third correctable error storm. For example, a quantity of correctable errors in each correctable error storm is 10, and a predetermined time for timing performed by a BMC is 10 minutes.

301. Generate the first correctable error.

When a hardware fault occurs, the first correctable error is generated. For example, the correctable error is generated by a module because of triggering by the hardware fault.

302. An EMCA records error data into a register.

When the correctable error is generated, a system records the error data into the register using the EMCA.

303. The EMCA generates an SMI and sends the SMI to a BIOS.

Corresponding to the correctable error, the SMI is a correctable SMI (CSMI).

304. The BIOS collects the error data from the register.

After receiving the CSMI, the BIOS collects the error data from the register using an interrupt handler.

305. The BIOS sends the error data to the BMC.

For example, the BIOS may send the error data to the BMC using an IPMI.

306. The BMC processes the error data.

For example, the BMC performs processing, such as parsing or archiving, on the error data.

307. The BIOS sets a quantity of correctable errors to 1.

The BIOS counts the quantity of correctable errors. Because the correctable error is the first correctable error, a quantity of current correctable errors is zero. Therefore, the quantity of correctable errors is set to 1.

Similar processing is performed on the second to the ninth correctable errors, and the quantity of correctable errors is increased by 1 each time. The following describes processing performed on the tenth correctable error.

308. Generate the tenth correctable error.

309. The EMCA records error data into the register.

310. The EMCA generates an SMI and sends the SMI to the BIOS.

311. The BIOS collects the error data from the register.

312. The BIOS sends the error data to the BMC.

313. The BMC processes the error data.

Steps 308 to 313 are similar to steps 301 to 306. For brevity, details are not described herein again.

314. The BIOS increases the quantity of correctable errors to 10.

315. The BIOS disables SMI.

Because the quantity of correctable errors has reached a predetermined value 10, it is determined that a correctable error storm has occurred. Therefore, SMI of generation modules of the 10 correctable errors is disabled.

316. The BIOS sends SMI-disabled notification information to the BMC.

For example, the BIOS may send the SMI-disabled notification information to the BMC using the IPMI.

317. The BMC starts timing.

After receiving the SMI-disabled notification information, the BMC performs timing for 10 minutes.

318. The BMC sends enable-SMI notification information to the BIOS.

After performing timing for 10 minutes, the BMC sends the enable-SMI notification information to the BIOS, to instruct the BIOS to enable the disabled SMI of the generation modules of the correctable errors.

319. The BIOS enables the SMI.

Because a quantity of times for which the SMI is disabled is less than a predetermined quantity 3 of times, after receiving the enable-SMI notification information, the BIOS enables the disabled SMI of the generation modules of the correctable errors.

Processing similar to that performed on the first correctable error storm is performed on the second correctable error storm. The following describes the manner of handling the third correctable error storm with reference to FIG. 4.

Steps 401 to 416 are similar to steps 301 to 316 in FIG. 3. For brevity, details are not described herein again.

417. The BMC performs alarming.

Because a quantity of times for which the SMI is disabled has reached the predetermined quantity 3 of times, it may be determined that a hardware fault has occurred. Therefore, the BMC outputs fault alarm information, such that the hardware fault can be cleared in a timely manner.

418. The BMC starts timing.

After receiving the SMI-disabled notification information, the BMC performs timing for 10 minutes.

419. The BMC sends enable-SMI notification information to the BIOS.

After performing timing for 10 minutes, the BMC sends the enable-SMI notification information to the BIOS, to instruct the BIOS to enable the disabled SMI of the generation modules of the correctable errors.

420. The BIOS does not enable the SMI again.

Because the quantity of times for which the SMI is disabled has reached the predetermined quantity 3 of times, the BIOS does not enable the SMI again that has been disabled for three times.

According to the foregoing solutions, in the case of a correctable error storm, a hardware fault can be detected, and a system does not fall into an interrupt trap.

It should be understood that procedures in FIG. 3 and FIG. 4 are merely examples and shall not be construed as limitations on the protection scope of the present disclosure.

It should be further understood that, in the embodiments of the present disclosure, sequence numbers of the foregoing processes do not mean execution sequences. The execution sequences of the processes should be determined according to functions and internal logic of the processes, and shall by no means limit the implementation processes of the embodiments of the present disclosure.

The foregoing describes in detail the troubleshooting method according to the embodiments of the present disclosure. The following describes a computer system, a BMC, and a system according to the embodiments of the present disclosure.

Figure 5:
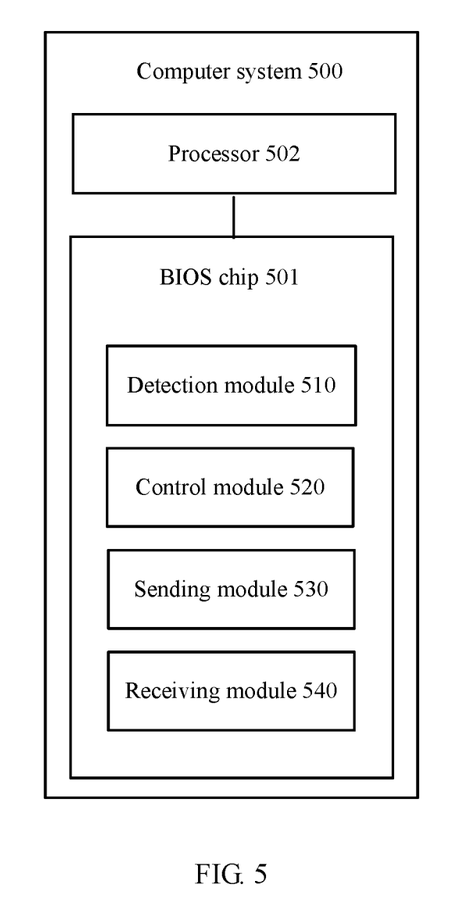
FIG. 5 is a block diagram of a computer system according to an embodiment of the present disclosure.

FIG. 5 is a block diagram of a computer system 500 according to an embodiment of the present disclosure. As shown in FIG. 5, the computer system 500 may include a BIOS chip 501 and a processor 502. The processor 502 is configured to execute a module in the BIOS chip 501.

As shown in FIG. 5, the BIOS chip 501 includes a detection module 510 configured to determine, according to collected information of correctable errors, that a correctable error storm has occurred, a control module 520 configured to disable system management interrupt SMI of generation modules of correctable errors in a correctable error set, where the correctable error set includes correctable errors related to the correctable error storm, a sending module 530 configured to send SMI-disabled notification information to a baseboard management controller BMC, and a receiving module 540 configured to receive enable-SMI notification information that is sent by the BMC after a predetermined time elapses after the SMI-disabled notification information is received.

The control module 520 is further configured to enable the disabled SMI of the generation modules of the correctable errors according to the enable-SMI notification information.

According to the computer system in this embodiment of the present disclosure, SMI of generation modules of correctable errors is disabled and enabled, such that error data can be collected without an interrupt trap, and a generation module of a correctable error caused by a non-hardware fault is not affected. Therefore, a correctable error storm can be effectively handled.

Optionally, in an embodiment of the present disclosure, the control module 520 is further configured to disable SMI of a generation module of each correctable error in the correctable error set, or disable SMI of generation modules of some correctable errors in the correctable error set.

Optionally, in an embodiment of the present disclosure, the enable-SMI notification information is sent after the predetermined time elapses after the BMC receives the SMI-disabled notification information.

Optionally, in an embodiment of the present disclosure, the predetermined time is 10 minutes.

Optionally, in an embodiment of the present disclosure, the control module 520 is further configured to skip enabling SMI of a first module again if a quantity of times for which the SMI of the first module is disabled has reached a predetermined quantity of times, where the first module is an SMI-disabled correctable-error generation module.

Optionally, in an embodiment of the present disclosure, the predetermined quantity of times is 3.

Optionally, in an embodiment of the present disclosure, the detection module 510 is further configured to if a quantity of correctable errors has reached a predetermined value, determine that the correctable error storm has occurred, where the correctable errors related to the correctable error storm are currently collected correctable errors whose quantity is the predetermined value.

Optionally, in an embodiment of the present disclosure, the predetermined value is 10.

Optionally, in an embodiment of the present disclosure, the detection module 510 is further configured to collect a first correctable error, and set the quantity of correctable errors to 1 if a quantity of current correctable errors is zero. Or, set the quantity of correctable errors to 1 if a quantity of current correctable errors is not zero and an interval between an occurrence time of the first correctable error and an occurrence time of a second correctable error is greater than a predetermined interval, where the second correctable error is a last correctable error that occurs before the first correctable error. Or, in another alternative, increase the quantity of correctable errors by 1 if a quantity of current correctable errors is not zero and an interval between an occurrence time of the first correctable error and an occurrence time of a second correctable error is less than a predetermined interval.

Optionally, in an embodiment of the present disclosure, the predetermined interval is one minute.

Optionally, in an embodiment of the present disclosure, the detection module 510 is further configured to set the quantity of correctable errors to zero after the SMI of the generation module of each correctable error in the correctable error set is disabled.

Figure 6:
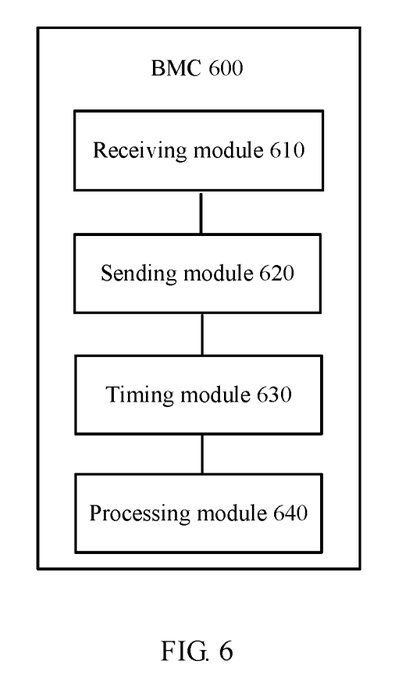
FIG. 6 is a block diagram of a BMC according to an embodiment of the present disclosure.

FIG. 6 is a block diagram of a BMC 600 according to an embodiment of the present disclosure. It should be understood that the BMC 600 may correspond to the BMC in the method embodiments, and may have any function of the BMC in the methods. As shown in FIG. 6, the BMC 600 includes a receiving module 610 configured to receive SMI-disabled notification information that is sent by a basic input/output system BIOS after system management interrupt SMI of generation modules of correctable errors in a correctable error set is disabled, and a sending module 620 configured to send enable-SMI notification information to the BIOS after a predetermined time. The enable-SMI notification information is used to instruct the BIOS to enable the disabled SMI of the generation modules of the correctable errors.

The BMC in this embodiment of the present disclosure sends SMI notification information to a BIOS, and can control the BIOS to enable disabled SMI of generation modules of correctable errors, such that error data can be collected without an interrupt trap. Therefore, a correctable error storm can be effectively handled.

Optionally, in an embodiment of the present disclosure, the BMC 600 further includes a timing module 630 configured to start timing each time the SMI-disabled notification information is received. The sending module 620 is further configured to send the enable-SMI notification information after the timing module 630 performs timing for the predetermined time.

Optionally, in an embodiment of the present disclosure, the predetermined time is 10 minutes.

Optionally, in an embodiment of the present disclosure, the BMC 600 further includes a processing module 640, configured to output fault alarm information of a first module if it is determined, according to the SMI-disabled notification information, that a quantity of times for which SMI of the first module is disabled has reached a predetermined quantity of times, where the first module is an SMI-disabled correctable-error generation module.

Optionally, in an embodiment of the present disclosure, the predetermined quantity of times is 3.

Figure 7:
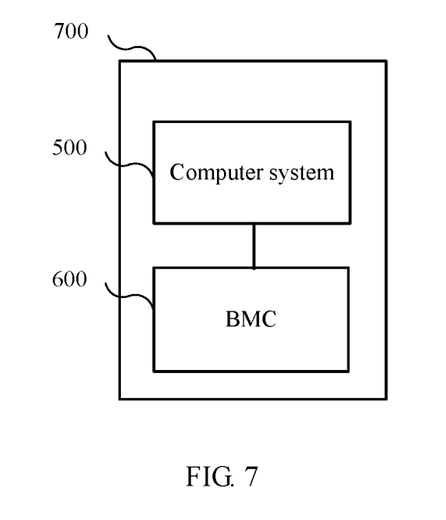
FIG. 7 is a block diagram of a system according to an embodiment of the present disclosure.

FIG. 7 is a block diagram of a system 700 according to an embodiment of the present disclosure. As shown in FIG. 7, the system 700 includes the computer system 500 in the foregoing embodiment of the present disclosure and the BMC 600 in the foregoing embodiment of the present disclosure.

Figure 8:
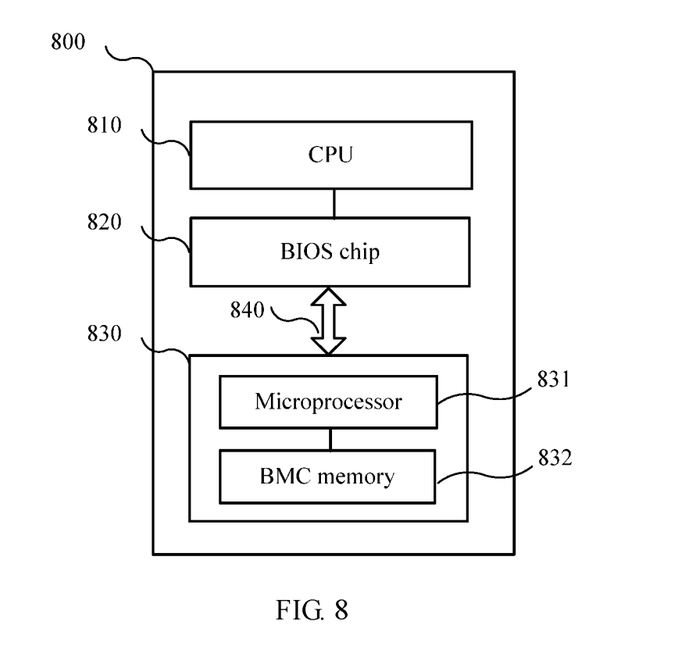
FIG. 8 is a block diagram of a system according to another embodiment of the present disclosure.

FIG. 8 is a block diagram of a system 800 according to another embodiment of the present disclosure. As shown in FIG. 8, the system 800 may include a CPU 810, a BIOS chip 820, a BMC 830, and a bus 840. The bus 840 is configured to implement connections and communication between the components. For example, the bus 840 may include an IPMI. The BIOS chip 820 stores a BIOS program. The CPU 810 may execute the BIOS program stored in the BIOS chip 820. The BMC 830 may include a microprocessor 831 and a BMC memory 832. The BMC memory 832 stores a BMC program. The microprocessor 831 may execute the BMC program stored in the BMC memory 832. In some implementations, the CPU 810 executes the BIOS program stored in the BIOS chip 820, and the microprocessor 831 executes the BMC program stored in the BMC memory 832, to execute the method in the foregoing embodiments of the present disclosure.

Optionally, the system 800 may further include another computer component. This is not limited in this embodiment of the present disclosure.

The foregoing and other operations and/or functions of the modules in the computer system, the BMC, and the system in the embodiments of the present disclosure are intended to separately implement corresponding processes of the methods in the foregoing embodiments of the present disclosure. For brevity, details are not described herein again.

An embodiment of the present disclosure further provides a computer storage medium. The computer storage medium stores program code. The program code may be used to instruct to execute the methods in the foregoing embodiments of the present disclosure.

It should be understood that, the term "and/or" in the embodiments of the present disclosure describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, the units and algorithm steps in the examples described with reference to the embodiments disclosed in this specification can be implemented by electronic hardware, computer software, or a combination thereof. To clearly describe the interchangeability of hardware and software, the foregoing has described compositions and steps of each example by function in general. Whether the functions are performed by hardware or software depends on particular applications and design constraint conditions of the technical solutions. A person skilled in the art may use a different method to implement the described functions for each particular application, but it should not be considered that the implementation goes beyond the scope of the present disclosure.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be indirect couplings or communication connections using some interfaces, apparatuses or units, or may be electrical, mechanical, or other forms of connections.

The units described as separate parts may or may not be physically separate. Parts displayed as units may or may not be physical units, and may be located in one position or distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A troubleshooting method implemented by a processor device, comprising:
   determining, according to collected information of correctable errors, that a correctable error storm has occurred;
   disabling a system management interrupt (SMI) of generation modules of correctable errors in a correctable error set, wherein the correctable error set comprises correctable errors related to the correctable error storm;
   sending SMI-disabled notification information to a baseboard management controller (BMC);
   receiving enable-SMI notification information that is sent by the BMC after a predetermined time elapses after the SMI-disabled notification information has been received; and
   enabling the disabled SMI of the generation modules of the correctable errors according to the enable-SMI notification information.

2. The method according to claim 1, wherein the method comprises:
   disabling SMI of the generation modules for all correctable errors in the correctable error set.

3. The method according to claim 2, wherein the method further comprises:
   setting the correctable errors quantity to zero after the SMI of the generation module of each correctable error in the correctable error set has been disabled.

4. The method according to claim 1, wherein the method comprises:
   disabling SMI of the generation modules for at least a portion of the correctable errors in the correctable error set.

5. The method according to claim 1, wherein if a quantity of times the SMI of a first module has been disabled exceeds a predetermined quantity of times threshold, the SMI of the first module is not enabled.

6. The method according to claim 1, wherein the method comprises:
   determining the correctable error storm has occurred when a correctable errors quantity exceeds a predetermined error storm threshold, wherein the correctable errors related to the correctable error storm are currently collected correctable errors.

7. The method according to claim 6, the method further comprises:
   collecting a correctable error; and
   setting the correctable errors quantity to 1 if a correctable errors quantity is zero.

8. The method according to claim 6, wherein the method further comprises:
   collecting a correctable error; and
   setting the correctable errors quantity to 1 if a correctable errors quantity is not zero and a time interval between the correctable error and a previous correctable error exceeds a predetermined interval.

9. The method according to claim 6, wherein the method further comprises:
   collecting a first correctable error; and
   incrementing the correctable errors quantity by 1 when a time interval between the correctable error and a previous correctable error is less than a predetermined interval.

10. A troubleshooting method implemented by a processor device, the method comprising:
    receiving SMI-disabled notification information that is sent by a basic input/output system (BIOS) after a system management interrupt (SMI) of generation modules of correctable errors in a correctable error set has been disabled; and
    sending enable-SMI notification information to the BIOS after a predetermined time, wherein the enable-SMI notification information is used to instruct the BIOS to enable the disabled SMI of the generation modules of the correctable errors.

11. The method according to claim 10, wherein the method comprises:
    starting timing each time the SMI-disabled notification information is received; and
    sending the enable-SMI notification information after timing is performed for the predetermined time.

12. The method according to claim 10, wherein the method further comprises:
    outputting fault alarm information of a first module when it has been determined, according to the SMI-disabled notification information, that a quantity of times for which SMI of the first module has been disabled has reached a predetermined quantity of times threshold.

13. A computer system, comprising:
    a basic input/output system (BIOS) chip storing instructions; and
    a processor in communication with the BIOS chip, with the processor configured to execute the instructions to:
        determine, according to collected information of correctable errors, that a correctable error storm has occurred;
        disable system management interrupt (SMI) of generation modules of correctable errors in a correctable error set, wherein the correctable error set comprises correctable errors related to the correctable error storm;
        send SMI-disabled notification information to a baseboard management controller (BMC); and
        receive enable-SMI notification information sent by the BMC after a predetermined time elapses after the SMI-disabled notification information has been received;
    wherein the processor enables the disabled SMI of the generation modules according to the enable-SMI notification information.

14. The computer system according to claim 13, wherein the control module is further configured to:
    disable SMI of the generation modules for all correctable errors in the correctable error set.

15. The computer system according to claim 14, wherein the detection module is further configured to:

set the correctable errors quantity to zero after the SMI of the generation module of each correctable error in the correctable error set has been disabled.

16. The computer system according to claim 13, wherein the control module is further configured to:
disable SMI of the generation modules for at least a portion of the correctable errors in the correctable error set.

17. The computer system according to claim 13, wherein the control module is further configured to:
skip enabling SMI of a first module if a quantity of times for which the SMI of the first module is disabled has reached a predetermined quantity of times threshold.

18. A baseboard management controller (BMC), comprising:
a receiving device configured to receive SMI-disabled notification information sent by a basic input/output system (BIOS) after system management interrupt (SMI) of generation modules of correctable errors in a correctable error set has been disabled; and
a sending device configured to send enable-SMI notification information to the BIOS after a predetermined time, wherein the enable-SMI notification information instructs the BIOS to enable the disabled SMI of the generation modules.

19. The BMC according to claim 18, wherein the BMC further comprises:
a timing device configured to begin timing each time the SMI-disabled notification information is received;
wherein the sending device is further configured to send the enable-SMI notification information after the timing device performs timing for the predetermined time.

20. The BMC according to claim 19, wherein the BMC further comprises:
a processing device configured to output fault alarm information for a first module when it has been determined, according to the SMI-disabled notification information, that a quantity of times for which SMI of the first module has been disabled has reached a predetermined quantity of times threshold.

* * * * *